(12) United States Patent
Washington

(10) Patent No.: US 7,925,013 B1
(45) Date of Patent: Apr. 12, 2011

(54) SYSTEM FOR DATA ENCRYPTION AND DECRYPTION OF DIGITAL DATA ENTERING AND LEAVING MEMORY

(75) Inventor: Winefred Washington, Cedar Park, TX (US)

(73) Assignee: Conexant Systems, Inc., Newport Beach, CA (US)

( * ) Notice: Subject to any disclaimer, the term of this patent is extended or adjusted under 35 U.S.C. 154(b) by 1025 days.

(21) Appl. No.: 10/611,402

(22) Filed: Jun. 30, 2003

(51) Int. Cl.
- H04L 9/00 (2006.01)
- G06F 1/04 (2006.01)
- G06F 1/00 (2006.01)

(52) U.S. Cl. ............... 380/44; 380/37; 380/46; 380/47; 380/239; 380/255; 380/259; 380/262; 380/265; 380/268; 380/277; 380/278; 380/279; 713/160; 713/171; 713/182; 713/190; 713/191; 713/400; 713/401; 713/500; 713/600; 713/601; 726/2; 726/4; 726/26; 726/34

(58) Field of Classification Search ............... 380/265, 380/37, 268, 277, 46–47
See application file for complete search history.

(56) References Cited

U.S. PATENT DOCUMENTS

| | | | | |
|---|---|---|---|---|
| 4,305,131 A * | 12/1981 | Best | | 715/716 |
| 4,484,027 A | 11/1984 | Lee et al. | | |
| 5,412,721 A | 5/1995 | Rager et al. | | |
| 5,825,879 A * | 10/1998 | Davis | | 380/216 |
| 5,960,084 A | 9/1999 | Angelo | | |
| 5,974,179 A * | 10/1999 | Caklovic | | 382/232 |
| 5,999,629 A * | 12/1999 | Heer et al. | | 705/51 |
| 6,005,943 A | 12/1999 | Cohen et al. | | |
| 6,014,445 A * | 1/2000 | Kohda et al. | | 380/28 |
| 6,124,882 A | 9/2000 | Voois et al. | | |
| 6,185,682 B1 | 2/2001 | Tang | | |
| 6,212,633 B1 | 4/2001 | Levy et al. | | |
| 6,400,823 B1 | 6/2002 | Angelo | | |
| 6,438,666 B2 | 8/2002 | Cassagnol et al. | | |
| 6,490,354 B2 * | 12/2002 | Venkatesan et al. | | 380/43 |
| 6,526,144 B2 | 2/2003 | Markandey et al. | | |
| 6,560,338 B1 * | 5/2003 | Rose et al. | | 380/47 |
| 6,560,727 B1 * | 5/2003 | Pierson et al. | | 714/704 |
| 6,763,363 B1 * | 7/2004 | Driscoll | | 708/252 |
| 6,804,354 B1 * | 10/2004 | Driscoll | | 380/28 |
| 6,862,354 B1 * | 3/2005 | McGrew et al. | | 380/42 |
| 7,143,294 B1 * | 11/2006 | Johnson | | 713/189 |
| 7,373,668 B1 * | 5/2008 | Trimberger | | 726/26 |
| 2002/0025040 A1 | 2/2002 | Stein | | |
| 2002/0031218 A1 | 3/2002 | Lin | | |
| 2002/0076050 A1 | 6/2002 | Chen et al. | | |
| 2002/0106018 A1 | 8/2002 | D'Luna et al. | | |
| 2002/0123968 A1 | 9/2002 | Okayama et al. | | |
| 2002/0129245 A1 | 9/2002 | Cassagnol et al. | | |

(Continued)

FOREIGN PATENT DOCUMENTS

| | | |
|---|---|---|
| JP | 2002208216 | 7/2002 |
| WO | WO 98/43431 | 10/1998 |

*Primary Examiner* — Christian LaForgia
*Assistant Examiner* — Jenise E Jackson
(74) *Attorney, Agent, or Firm* — Jackson Walker L.L.P; Christopher J. Rourk

(57) ABSTRACT

A system is described for encryption and decryption of digital data prior to the digital data entering the memory of a digital device by generating a key, sub-key and combining the sub-key with mixed digital data, where the encryption and decryption occurs between the memory controller and the input output register.

26 Claims, 7 Drawing Sheets

U.S. PATENT DOCUMENTS

| | | | |
|---|---|---|---|
| 2002/0153923 A1* | 10/2002 | Piasecki et al. | 326/57 |
| 2003/0028888 A1* | 2/2003 | Hunter et al. | 725/89 |
| 2003/0081774 A1 | 5/2003 | Lin et al. | |
| 2003/0091185 A1* | 5/2003 | Swindlehurst et al. | 380/44 |
| 2003/0151427 A1* | 8/2003 | Piasecki et al. | 326/47 |
| 2004/0141567 A1* | 7/2004 | Yang et al. | 375/287 |
| 2005/0204224 A1* | 9/2005 | Piasecki et al. | 714/724 |
| 2006/0239453 A1* | 10/2006 | Halpern | 380/45 |
| 2007/0237332 A1* | 10/2007 | Lyle | 380/263 |
| 2008/0046728 A1* | 2/2008 | Lyle | 713/169 |

\* cited by examiner

SYSTEM FOR DATA ENCRYPTION AND DECRYPTION OF DIGITAL DATA ENTERING AND LEAVING MEMORY

BACKGROUND OF THE INVENTION

1. Field of the Invention

This invention relates generally to data encryption and more particularly to data encryption of digital data in memory.

2. Related Art

Unauthorized copying of digital content is a growing problem with the proliferation of digital media. Digital media is being delivered to consumers via digital cable systems, digital satellites systems, telephone systems, data networks, and storage devices such as CDs, DVDs, VCDs, etc.... Examples of such a system in operation includes a cable system delivering encrypted digital video to a subscriber's set-top box. In attempts to stop the unauthorized copying of digital media, companies and industries have developed digital encryption methods and systems.

The digital encryption methods and systems encrypt the digital data being delivered to a digital device and provide data encryption keys. In other digital devices, the data encryption keys are secret hard-wired keys or programmable fuses. The encrypted digital data is then decrypted employing the data encryption keys stored in the memory of the digital device when accessed by a user. Unsecure rewriteable memory or hard-wired keys in the digital device enables industrious hackers to monitor accesses to the memory, reverse engineer data encryption keys and access the digital data, or copy the unencrypted data from unsecure rewriteable memory.

Therefore, there is a need for methods and systems for encrypting and decrypting digital data when delivered to a user that overcomes the disadvantages set forth above and others previously experienced.

SUMMARY

Methods and systems consistent with the present invention provide data encryption and decryption at the memory interface in a digital device. A clock generator and a linear feedback shift register in the digital device generates one or more encryption keys for use by an encryption algorithm every time the digital device is cycled or reset. An inaccurate clock is employed that oscillates at different frequencies depending on gate delays, temperature and voltage. It is therefore the clock rate that is unpredictable and is very likely to differ upon cycling or resetting the digital device resulting in different keys being generated. Further, a pseudo random, number may be generated for use by other programs on the digital device or for secure transactions.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION

Figure 1:
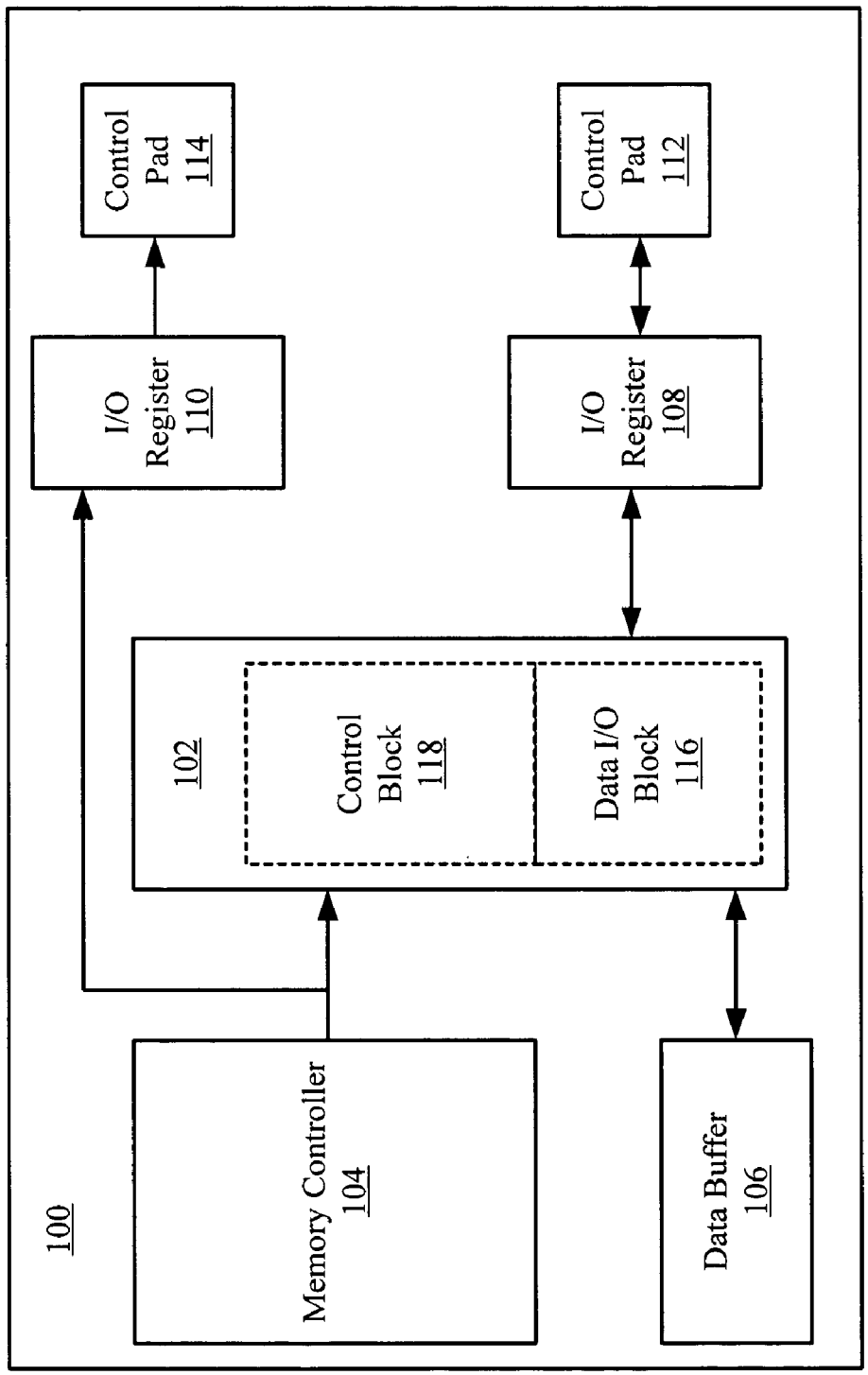
FIG. 1 illustrates a block diagram of an exemplar digital device with an encryption circuit.

Turning first to FIG. 1, that figure shows a block diagram of an exemplar digital device 100 with an encryption circuit 102. The digital device 100 has a memory controller 104, data buffer 106, input/output (I/O) register 108, I/O register 110, control pad 112 and control pad 114. The encryption circuit 102 also has a control block 118 and data I/O block 116. The digital device 100 may be a digital set-top box, MP-3 player, encrypted CD/DVD/VCD player, or digital video recorder to name but a few example digital devices.

The memory controller 104 communicates with the encryption circuit 102 and I/O register 110. The encryption circuit 102 communicates with the memory controller 104, data buffer 106 and data register 108. Both I/O register 108 and I/O register 110 communicate with respective control pads 112 and 114. A control pad is an interface point to another circuit or bus, such as a pin on an integrated circuit package, a solder point pad on circuit board, a doped connection within an integrated circuit, and a wire for connection to another circuit.

The encryption circuit 102 is placed between the data buffer 106 and I/O register 108. The encryption circuit 102 employs the memory control signal from the memory controller 104 to extract the row and bank information employed to read and write digital data to memory. In the present example, there are no latencies or clock offsets inserted in the data paths. In other implementations, clock cycles or other latencies may be designed into the encryption circuit 102. The encryption circuit 102 is used with memory that is rewritable, such as RAM, SDRAM, and EEPROM, or a combination of such rewriteable memory.

Digital data ready for encryption is stored in the data buffer 106. The digital data is moved from the data buffer 106 through the encryption circuit 102 to the I/O register 108 under the control of memory controller 104. The digital data is encrypted by the encryption circuit 102 prior to entering the I/O register 108. From the I/O register 108, the encrypted data is written to a memory location by the memory controller 104.

The control block 118 of the encryption circuit 102 generates and maintains the encryption keys and sub-keys used in encrypting the digital data. The data I/O block 116 of the encryption circuit 102 processes the digital data going to or retrieved from memory.

For decryption, the reverse process occurs and the encrypted digital data is decrypted as it is transferred from memory to the I/O register 108 for use via the data buffer 106 by the encryption circuit 102.

Figure 2:
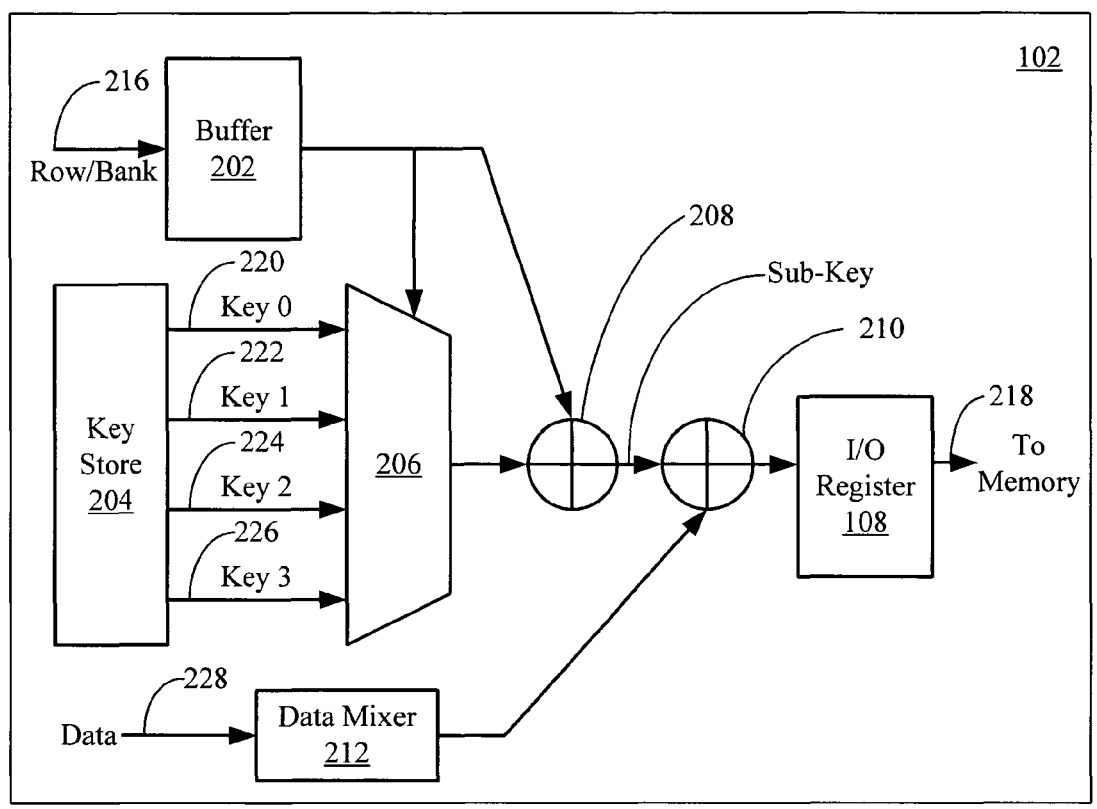
FIG. 2 illustrates a block diagram of the encryption circuit of FIG. 1.

In FIG. 2, a block diagram of the encryption circuit 102 FIG. 1 is shown. A buffer 202 contains the row/bank address data 216 from the memory controller 104. The key store 204 contains the encryption keys that are generated for each bank of memory. A multiplexer 206 is controlled by the row/bank address data contained in buffer 202 and selects an encryption key from the key store 204. The encryption key selected and the row/bank information are computed by a combiner 208 to form a sub-key.

The sub-key is combined with digital data 228 that is sent through the data mixer 212 by combiner 210. The data mixer 212 scrambles portion of the memory data bus by rearranging the bits of each byte of digital data. Each reordered bit stays in its original byte lane to facilitate byte length memory writing. The output of combiner 210 is then transferred to the I/O register 108 and the signal 218 is made available to the control pad 112. In the exemplar implementation, there are four keys (key 0 220, key 1 222, key 2 224, key 3 226). In other implementations, other number of keys may be employed.

Figure 3:
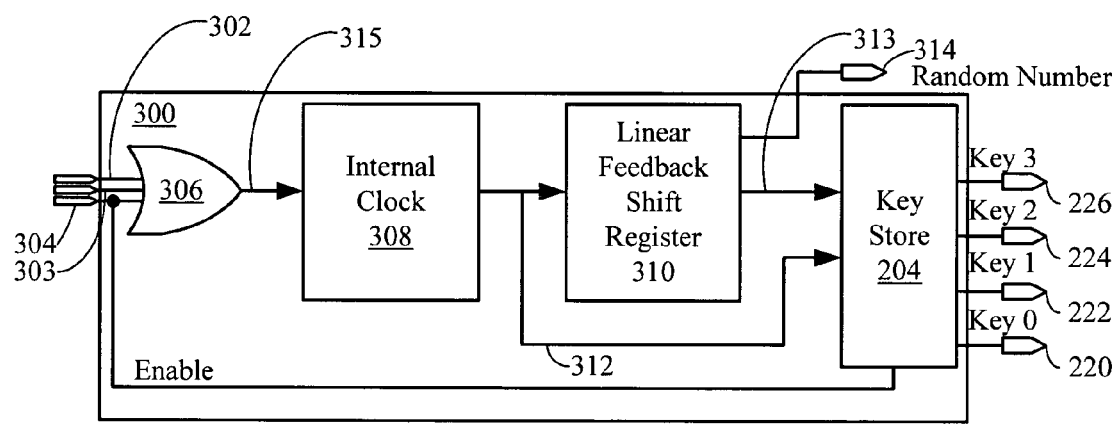
FIG. 3 illustrates a block diagram of the encryption key generator and key store of FIG. 2.

Turning to FIG. 3, a block diagram of the encryption key generator 300 and key store 204 of FIG. 2 is shown. A reset signal 302, trigger signal 303 and enable signal 304 are inputs to an OR gate 306. The output 315 of the OR gate 306 is connected to an internal clock 308. The internal clock 308, in the exemplar implantation, is an oscillator that drifts and that may be affected by temperature and voltage. The internal clock 308 generates a clocking signal 312 that is received by the linear feedback shift register 310 and the key store 204.

The linear feedback shift register 310 has a predetermined polynomial that may be assigned based on the customer, type of device or randomly. The predetermined polynomial may be programmed with fuses within an integrated circuit, PROMs, EPROMS, EEPROMS, or hardwired. The linear feedback shift register 310 generates a pseudorandom bit pattern 313.

The bit pattern 313 is also received at the key store 204. While the enable signal 304 is received at the key store 204, no data is retained in the keys 220, 222, 224, and 226. When the enable signal 304 is removed, the bits from the polynomial in the key store are retained and made available to the encryption circuit 102.

A random number output 314 is also made available from the linear feedback shift register 310 and is activated by the reset signal 302, trigger signal 303, or the enable signal 304. Whenever the trigger signal is present, a new random number 314 is made available by the linear feedback shift register 310 and internal clock 308. The random number 314 may be used by software within the digital device. For example, in an authentication or secure identification procedure. Additionally, when the reset signal 302 or enable signal 304 is present, a new random number 314 is generated by the linear feedback shift register 310 and internal clock 308. In other implementations, a random number may be held in the key store and regenerated whenever the keys 220, 222, 224, and 226 are regenerated.

Figure 4:
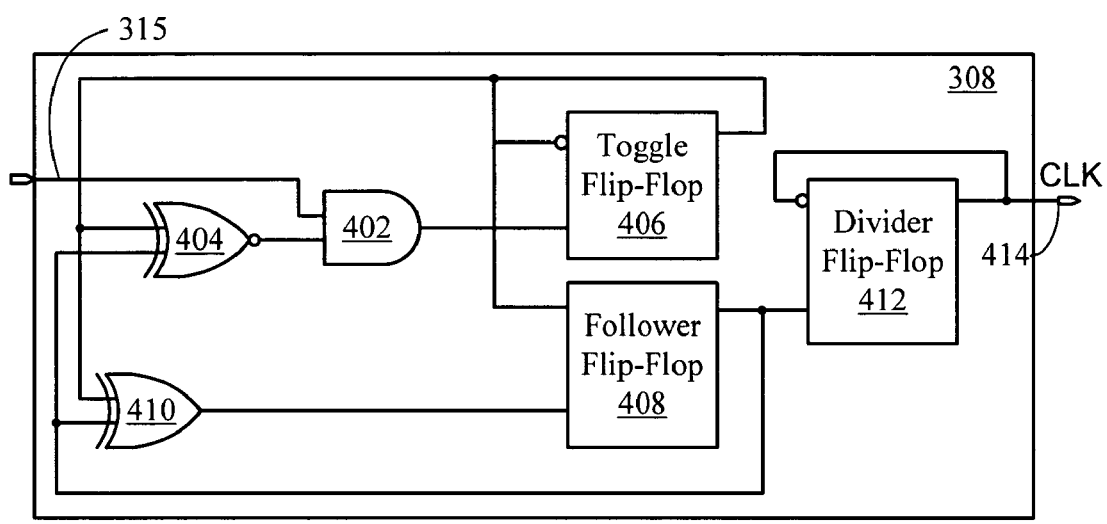
FIG. 4 illustrates a circuit diagram of the clock generation block of FIG. 3.

Turning now to FIG. 4, a circuit diagram of the internal clock 308 of FIG. 3. The signal 315 from the OR gate 306 is received by the AND gate 402 along with a signal from the XNOR gate 404. When both signals are present, the output of the AND gate 402 is sent to a toggle flip-flop 406. The output of the toggle flip-flop 406 is fed back into the toggle flip-flop 406, the input of the XNOR gate 404, the follower flip-flop 408, and the input of XOR gate 410. The output of XOR gate 410 is provided to another input of the follower flip-flop 408. The output of the follower flip-flop 408 is sent to the input of the XNOR gate 404, the input of the XOR gate 410 and the input of divider flip-flop 412. The output of the flip-flop 412 is feedback to the input of the divider flip-flop 412 in addition to being provided to the key store 204 as the clock signal 414.

Figure 5:
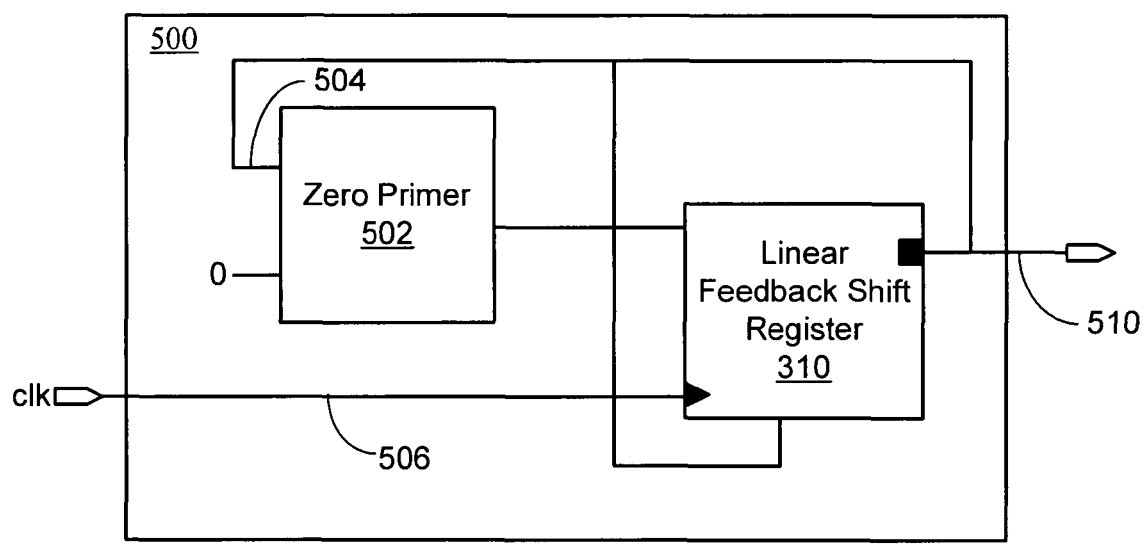
FIG. 5 is a circuit with a zero primer circuit employed with the linear shift register of FIG. 3.

In FIG. 5, a circuit 500 with a zero primer circuit 502 employed with the linear feedback shift register 310 of FIG. 3 is shown. The linear feedback shift register 310 may power-on in any state but all zeros. If zero is the output in response powering the circuit, then the circuit will feedback zero and output zero again. In order to prevent the linear feedback shift register 310 from failing with all zeros, a zero primer circuit 502 is employed. A value of zero is hard coded as an input to the zero primer 502. When a zero value is received as an input 504 at the zero primer 502 (zero value is also output 510 by the linear feedback shift register 310) a one bit is forced into the linear feedback shift register 310 and generation of a bit stream continues.

Figure 6:
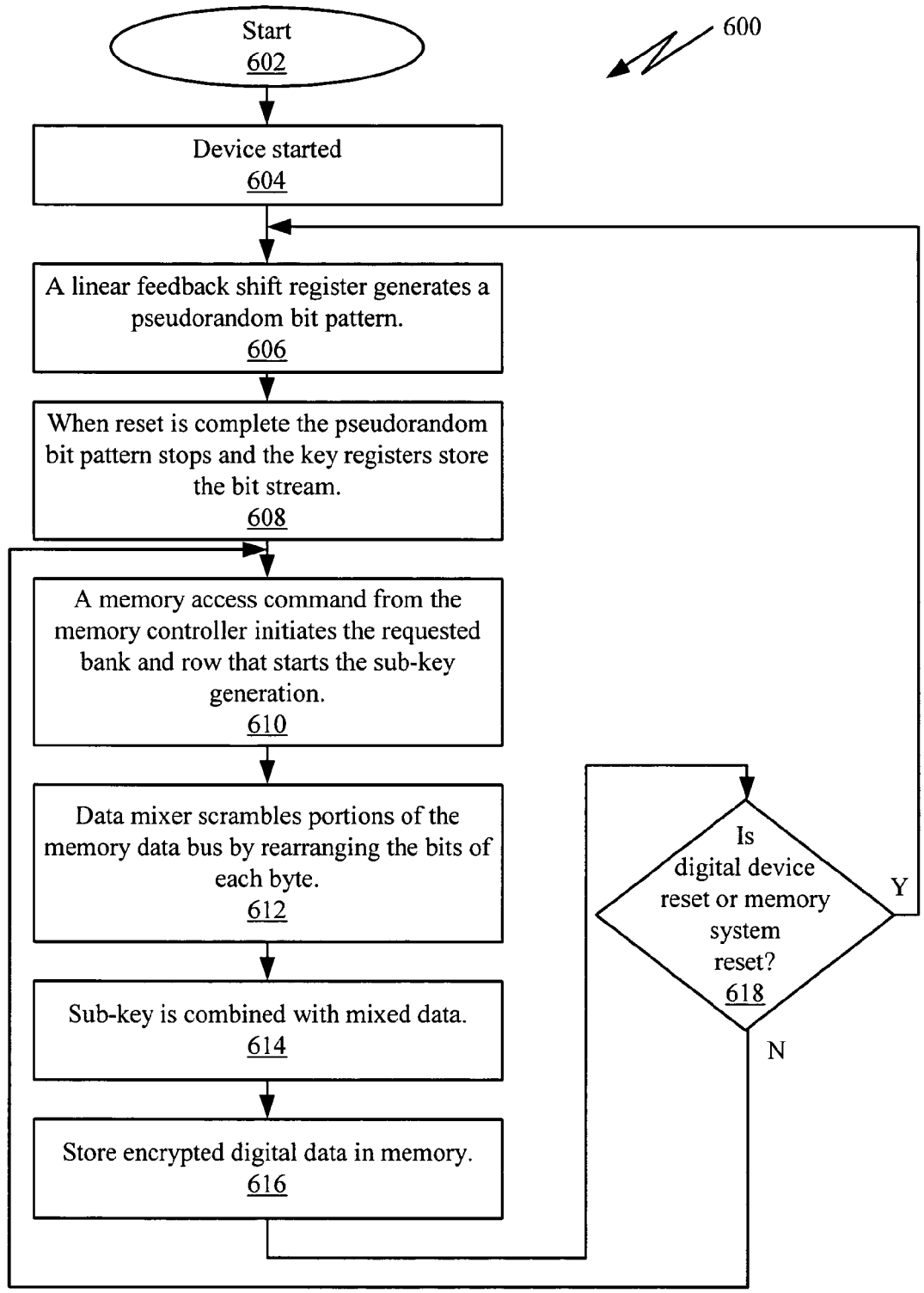
FIG. 6 is a flow diagram of the steps of digital data encryption of digital data entering memory.

Turning to FIG. 6, a flow diagram 600 of the process steps for digital data encryption of digital data entering memory is shown. The process starts (602) when the digital device 100 is powered on or started (604). A linear feedback shift register 310 generates a pseudorandom bit pattern. When the digital device finishes starting (commonly called booting), the linear feedback shift register stops and the key store 204 stores the bit stream (606).

A memory access command with bank and row information from the memory controller 104 initiates the sub-key generation (610). The bank selects a key from the key store and then the row forms a memory unit, such as a 32-bit word by replicating the byte. The 32-bit word and the selected key are combined resulting in a sub-key. The benefit of using a sub-key is to mask the key if the rewritable memory in the digital device 100 has previously been previously set to known values, such as all zeros.

Next, the data mixer 212 scrambles portions of the memory data bus by rearranging the bits of each byte (612). Each reordered bit must stay in its original byte lane since writes to memory may occur with whole bytes or groups of bytes. The next step is to combine the mixed data and sub-key (614). Each row of memory is a page in memory and each page has a unique sub-key and is exclusive "OR"ed with the digital data. The encrypted digital data is then stored in memory 616.

If the digital device is reset or the memory system of the digital device is reset (618) then the linear feedback shift register (310) generates another pseudorandom bit pattern (606) and the key generation and encryption process is repeated as described above. Otherwise, the process is just waits unit the digital device is reset (618).

Figure 7:
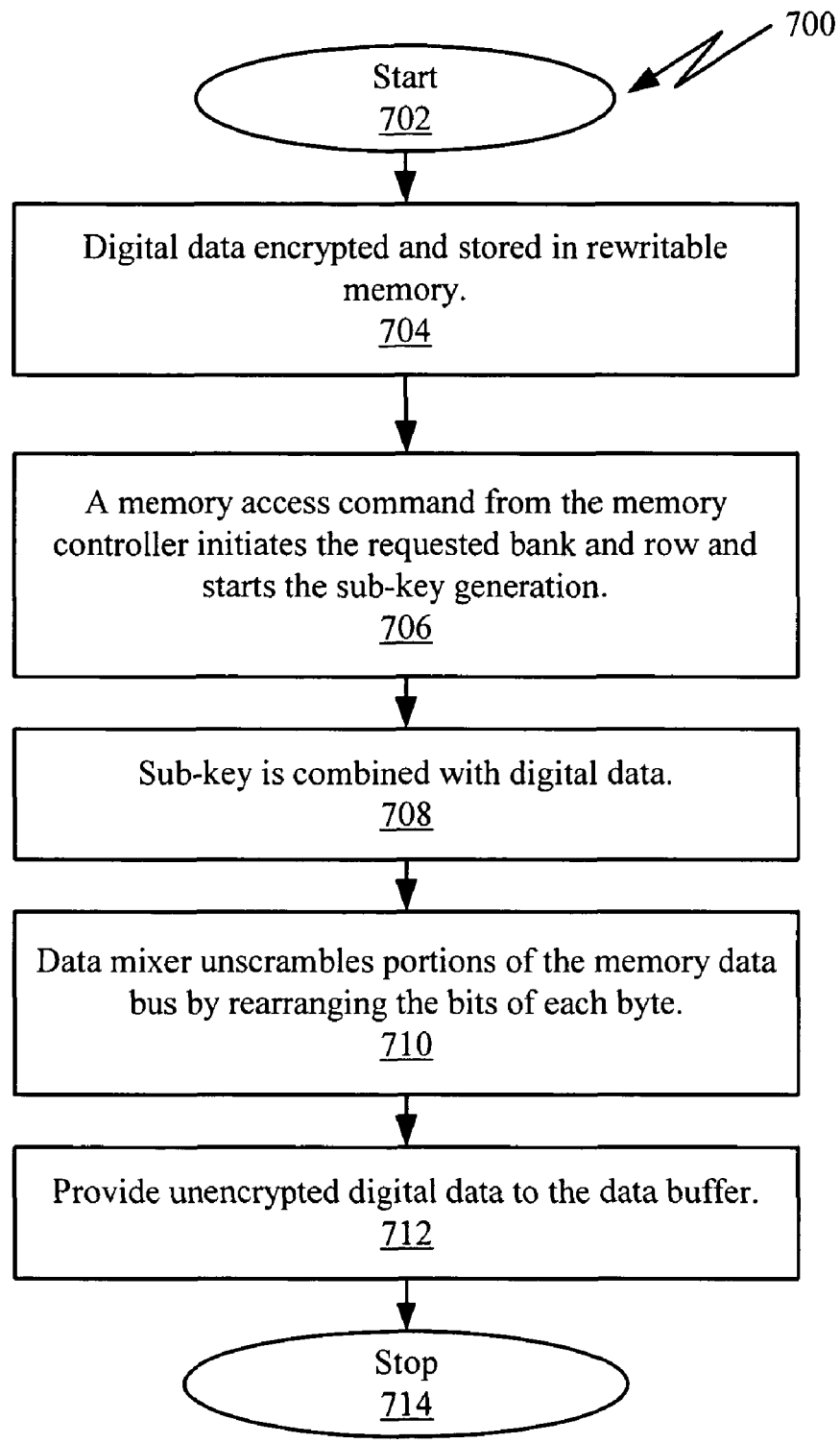
FIG. 7 is a flow diagram of the steps of retrieving and decryption of digital data contained in memory.

Turning to FIG. 7, a flow diagram 700 of the steps of retrieving and decryption of digital data contained in memory is shown. The process starts (702) with the digital data has previously been encrypted and stored in the rewritable memory of digital device 100 (704). The memory controller 104 issues a memory access command that contains a bank and row (706). The encrypted digital data in rewriteable memory is accessed and retrieved (708). The sub-key is identical to the sub-key employed during encryption. The data mixer 212 unscrambles portions of the memory data bus by rearranging the bits of each byte (710). The unencrypted digital data is then made available to the data buffer 106 (712) and the process is complete (714).

The foregoing description of an implementation has been presented for purposes of illustration and description. It is not exhaustive and does not limit the claimed inventions to the precise form disclosed. Modifications and variations are possible in light of the above description or may be acquired from practicing the invention. For example, the described implementation uses hardware alone but the invention may be implemented as a combination of hardware and software or in software alone. Note also that the implementation may vary between systems. The claims and their equivalents define the scope of the invention.

What is claimed is:

1. A system of digital data encryption in a digital device, comprising:
generating an inaccurate clock signal that oscillates at different frequencies;
an integrated encryption key generator generating a plurality of encryption keys based upon the input received from an inaccurate timing source; and based on the generated clock signal and a pseudorandom bit pattern generated in a linear feedback shift register each time the digital device is reset; a data buffer; an input/output register that interfaces with memory of the digital device; a control pad coupled to the input/output register; and a memory controller that directs digital data from the memory to the data buffer with the digital data passing through the encryption key generator prior to entering the input/output register, wherein the integrated encryption key generator is coupled between the data buffer and the input/output register, and the integrated encryption key generator, the data buffer, the input/output register, the control pad and the memory controller are formed on a single substrate and are accessed through the control pad.

2. The system of claim 1, where the encryption key generator includes:
an inaccurate clock;
a key store; and
a linear feedback shift register that generates a pseudorandom bit pattern while the linear feedback shift register is enabled and stores a plurality of bits as at least one key in the key store.

3. The system of claim 2, where the encryption key generator further includes a random number generator that receives the pseudorandom bit pattern from the linear feedback shift register and provides a random number for use by the digital device.

4. The system of claim 2, where the encryption key generator further includes:
a pseudorandom bit pattern generator that creates a bit stream; and
a key store that stores portions of the pseudorandom bit pattern as at least one of the plurality of keys.

5. The system of claim 4, including a pseudorandom number generator that selects a portion of the pseudorandom bit pattern to be a random number.

6. The system of claim 2, including:
a sub-key generator that creates a sub-key based on data from the memory controller and a selected key from the key store; and
a combiner that combines the sub-key with the digital data.

7. The system of claim 6, further including a data mixer that mixes bits of a byte of the digital data prior to the byte being combined with the sub-key.

8. A system configured to decrypt encrypted digital data stored in memory of a digital device, comprising:
generating an inaccurate clock signal that oscillates at different frequencies;
an encryption key generator receiving a signal from an inaccurate clock and generating a plurality of keys based on the generated clock signal and a pseudorandom bit pattern generated in a linear feedback shift register each time the digital device is reset; and for encrypting the encrypted digital data when the digital device is reset;
a memory controller that generates a memory request to retrieve the encrypted digital data; and
an encryption circuit that decrypts the encrypted digital data in response to the memory request of the memory controller using one or more of the plurality of keys.

9. The system of claim 8, including a combiner that combines one of the plurality of keys with bank and row information contained in the memory request resulting in a sub-key.

10. The system of claim 9, including a data mixer that unmixes bits within a byte after the sub-key is applied to the encrypted digital data.

11. A method of digital data encryption in a digital device, comprising: generating an inaccurate clock signal that oscillates at different frequencies;
generating a plurality of keys based on input received from an inaccurate clock, and based on the generated clock signal and a pseudorandom bit pattern generated in a linear feedback shift register each time the digital device is cycled; storing the plurality of keys;
placing the digital data in a data buffer; and encrypting the digital data using the at least one of the plurality of keys while the digital data is being placed in a rewritable memory.

12. The method of claim 11, where the generating the plurality of keys includes:
generating an inaccurate clock signal;
creating a pseudorandom bit pattern; and
storing at least one portion of the pseudorandom bit pattern in a key store as the plurality of keys.

13. The method of claim 12, where the pseudorandom bit pattern is generated by a linear feedback shift register.

14. The method of claim 12, further including generating a random number from the pseudorandom bit pattern.

15. The method of claim 14, further including selecting a portion of the pseudorandom bit pattern to be used as a random number.

16. The method of claim 11, further including:
mixing bits of a byte of the digital data with a data mixer; and
combining the byte with one of the plurality of keys.

17. The method of claim 11, further including:
generating a sub-key with data from the memory controller and the key; and
combining the sub-key with the digital data.

18. The method of claim 17, further including:
mixing bits of a byte of digital data with a data mixer; and
combining the byte with the sub-key.

19. The method of claim 12, further including generating a random number from the pseudorandom bit pattern.

20. A method to decrypt encrypted digital data stored in memory of a digital device, comprising: generating an inaccurate clock signal that oscillates at different frequencies; generating a plurality of keys based on input received from an inaccurate clock, and based on generated clock signal and a pseudorandom bit pattern generated in a linear feedback shift register each time the digital device is cycled; generating a memory request to retrieve the encrypted digital data; and decrypting the encrypted digital data using one of the plurality of keys.

21. The method of claim 20, further including combining one of the plurality of keys with bank and row information contained in the memory request to generate a sub-key.

22. The method of claim 21, further including unmixing a byte of encrypted digital data with a data mixer.

23. A set-top box apparatus in receipt of digital data for storage in a rewritable memory, comprising: generating an inaccurate clock signal that oscillates at different frequencies;

an apparatus generating a plurality of keys based on the generated clock signal and a pseudorandom bit pattern generated in a linear feedback shift register each time the apparatus is reset; a data buffer filled with the digital data;

and a memory controller that directs the storage of the digital data in the rewritable memory with the digital data being encrypted by the encryption circuit and the at least one key after the digital data has entered the data buffer but prior to being stored in the rewritable memory.

24. The set-top box apparatus of claim 23, where the encryption circuit further includes:

a pseudorandom bit stream generator that creates a pseudorandom bit stream; and a key store that stores the at least one key that is selected from the pseudorandom bit stream.

25. The set-top box apparatus of claim 23, where the encryption circuit further includes:

a data mixer that mixes bits of a byte of the digital data; and a combiner that combines the byte with the at least one key.

26. The system of claim 1 wherein the memory controller that directs digital data from the memory to the data buffer with the digital data passing through the encryption key generator prior to entering the input/output register comprises means for encrypting the digital data prior to entering the input/output register.

* * * * *